3,218,289
TETRAALKYL PYROMELLITATE PLASTICIZERS AND PLASTICIZED POLYVINYL COMPOSITIONS
Stanley P. Rowland, Cincinnati, Ohio, assignor to Rohm & Haas Company, Philadelphia, Pa., a corporation of Delaware
No Drawing. Filed July 17, 1958, Ser. No. 749,060
10 Claims. (Cl. 260—31.8)

This invention relates to polyvinyl compositions plasticized with tetraalkyl pyromellitates in which the alkyl groups contain from 6 to 8 carbon atoms; this invention also relates to the esters per se.

In recent years with greater use of resinous materials, there has been an increasing demand for high quality plasticizers. In applications in the electrical field, the requirements have been most exacting in view of the strenuous conditions to which the plasticized compositions are subjected.

I have discovered a limited group of esters of a tetrabasic aromatic carboxylic acid which imparts to polyvinyl resinous compositions a unique combination of remarkably high permanence, low temperature flexibility and superior electrical insulation. These valuable properties are quite unexpected considering the performance of the alkyl esters of another polybasic aromatic carboxylic acid, namely the phthalates. Common ortho-phthalate esters, such as di(2-ethylhexyl)phthalate, exhibit limited performance because of their poor permanence in the resinous compositions. Unexpectedly, notwithstanding that my esters also are esters of a polybasic aromatic carboxylic acid, they exhibit outstanding permanence in resinous compositions. Moreover, while polymeric plasticizers, such as the adipates of various glycols, exhibit adequate permanence in resins, they fail to provide adequate electrical insulation. Unlike polymeric plasticizers and unlike phthalates, the esters of my invention provide resinous compositions combining outstanding permanence with remarkable electrical insulation; they also have the added virtue of low temperature flexibility superior to conventional polymeric plasticizers.

The plasticizing esters of my invention are those of pyromellitic acid or anhydride which are tetraalkyl substituted. These alkyl groups are acyclic, straight or branched, and contain from 6 to 8, and preferably 8, carbon atoms.

Pyromellitates having cycloalkyl alcohol moieties do not demonstrate yet all the special advantages of the claimed acyclic esters. The alkyl groups of the claimed pyromellitates may be the same or different. Typical plasticizing esters of my invention are tetra-n-hexylpyromellitate
tetra(2-methylpentyl) pyromellitate
tetra(2,3-dimethylbutyl) pyromellitate
tetra(2,2-dimethylbutyl) pyromellitate
tetra-n-heptyl pyromellitate
tetra(2,2-dimethylpentyl) pyromellitate
tetra(2,4-dimethylpentyl) pyromellitate
tetra(2-ethylpentyl) pyromellitate
tetra(2-ethyl-4-methylpentyl) pyromellitate
tetra(methyl pentyl carbinyl) pyromellitate
tetra-n-octyl pyromellitate
tetra(2-ethylhexyl)pyromellitate
tetra(2,2-dimethylhexyl) pyromellitate
tetra(2,2,4-trimethylpentyl) pyromellitate
tetra(3,5-dimethylhexyl) pyromellitate
tetra(3,4-dimethylhexyl) pyromellitate
tetra(5-methylheptyl) pyromellitate
tetra(2,2-diethylbutyl) pyromellitate, and
tetra(methylhexyl carbinyl) pyromellitate.

An especially valuable group of pyromellitic esters are pyromellitic esters of branched 6, 7, or 8-carbon-containing alkanol mixtures obtained from the "Oxo" process and pyromellitic mixed esters of mixtures of alkanols containing 6 to 8 carbon atoms obtained from the Oxo process. In my invention, the terms tetrahexyl pyromellitate, tetraoctyl pyromellitate, and tetraheptyl pyromellitate designate pyromellitic acid or anhydride esterified with mixtures of alkanols, principally of the branched type obtained from the "Oxo" process and containing 6, 7, and 8 carbons, respectively. Tetraalkyl pyromellitates in which each alkyl group contains 8 carbon atoms are especially favored because of their unusual combination of superior properties.

While engaged in the instant work, I also have considered the corresponding esters of prehnitic acid and melophanic acid, but, as of now, these esters do not appear to equal the especial value of the present tetrapyromellitates. Another surprising observation which I made is that tetraalkyl pyromellitates in which the alkyl groups exceed 8 carbon atoms are of no practical value in polyvinyl resins because they are totally inefficient therein and because these esters, in failing to impart low temperature flexibility, give undesirable products which are excessively brittle in the lower range temperatures. On the other hand, the tetraalkyl pyromellitates in which the alkyl group is less than 6 do not seem to combine all of the advantages of our limited group of esters.

The esters of my invention are prepared from pyromellitic acid or the anhydride. The acid is obtainable from the oxidation of durene with nitric acid. The anhydride is obtainable by strongly heating the hexabasic mellitic acid. Esterification of pyromellitic acid may be effected with preferably an excess of one or more aliphatic unsubstituted straight- or branched-chain monohydric alkanols containing from 6 to 8 carbon atoms to form the corresponding esters.

These alkanols may be employed singly or in mixtures of alkanols of the same number of carbon atoms or not. The alkanols may be straight- or branched-chain alkanols. Mixtures of branched-chain alkanols may be obtained from the "Oxo" process by the catalytic reaction of an appropriate olefin or olefin mixture with carbon monoxide and hydrogen. The reaction occurs at temperatures in the order of 300° to 400° F., at pressures in the range of about 1000 to 3000 p.s.i., in the presence of a suitable catalyst ordinarily a heavy metal carbonyl, such as cobalt carbonyl. The resulting aldehyde is subsequently hydrogenated to a primary monohydric alcohol. Mixtures of 6, 7, and 8 carbon-containing "Oxo" alcohols may be employed for preparing the pyromellitic esters of my invention. Mixtures of "Oxo" alcohols containing from 6 to 8 carbon atoms may also be employed.

Esterification of pyromellitic acid or anhydride is conveniently effected by heating acid with at least one appropriate alkanol, preferably an excess over the stoichiometric amount, such as an excess of about 10% to 100% or more at a temperature range of about 200° to 250° C., preferably at reflux. Water of esterification is separated. An esterification catalyst, such as sulfuric acid, may be employed, if desired. Also, if desired, there may be used a water entrainer, such as a low-boiling solvent. When water evolution ceases, esterification is completed and excess alcohol is stripped off under vacuum. The esters of my invention are obtained in good yields.

The following illustrative examples further describe the preparation of typical esters of my invention. All parts are by weight.

*Example 1*

There are mixed 475.4 parts of 2-methylpentanol with 184.7 parts of pyromellitic dianhydride and 3 parts of sulfuric acid in a reaction flask adapted with a stirrer, a distillation column and a receiver. The reaction mixture is gradually heated to and maintained at a refluxing temperature of 150° C. Heating is continued until there are collected 30.3 parts of water. At that time, the pressure is reduced to 0.2 mm. of mercury to strip off excess 2-methylpentanol and these conditions are maintained until no more alcohol distills off. The mixture is then cooled and there are collected 454 parts of tetra(2-methylpentyl) pyromellitate. This ester is found to have a molecular weight of 580 ±12, a saponification number of 376, a 100% Gardner-Holdt viscosity of 0, and an iodine number of 0.01, an acid number of 0.056 and a hydroxyl number of 0. The appearance of this ester is clear.

In a similar manner, there are prepared from pyromellitic dianhydride tetra(2,3-dimethylbutyl) pyromellitate, tetra(2,2-dimethylbutyl) pyromellitate, and tetra-n-hexyl pyromellitate.

*Example 2*

In a reaction flask equipped as in Example 1, there are mixed 124.8 parts of pyromellitic acid and 351.5 parts of 2-ethylhexanol. The reaction mixture is gradually heated to and maintained at a refluxing temperature of 240° C. Heating is continued until there are collected in the receiver 31 parts of water, and at that time the pressure is reduced to 1 mm. of mercury to strip off residual water and excess alcohol. The reaction mixture is cooled and there are collected in good yields tetra(2-ethylhexyl) pyromellitate. This ester is found to have a molecular weight of 700 ±5 and an acid number of 0.07 and a 100% Gardner-Holdt viscosity of P.

Following a similar procedure as above, there are prepared tetra(2,2-dimethylhexyl) pyromellitate, tetra(2,2,4-trimethylpentyl) pyromellitate and tetra(2-ethyl-4-methylpentyl) pyromellitate.

*Example 3*

There are mixed 184.7 parts of pyromellitic dianhydried with 540 parts of n-heptanol and 3.0 parts of sulfuric acid in a flask equipper as in Example 1. The reaction mixture is heated gradually to and maintained at a refluxing temperature of 150° C. Heating is continued until there is collected in the receiver 153 parts of water. at that time, the pressure is reduced to 1 mm. of mercury to strip off residual water and excess n-heptanol. These conditions are maintained and n-alcohol distills off. The reaction mixture is cooled and there is collected in good yields tetra-n-hexyl pyromellitate. In a similar manner, there are prepared tetra(2,2-dimethylpentyl) pyromellite, tetra(2,4-dimethylpentyl) pyromellitate, tetra(2-ethylpentyl) pyromellitate, tetra(methyl pentyl carbinyl) pyromellitate.

*Example 4*

There are reacted 184.7 parts of pyromellitic dianhydride with 238 parts of 2-methylpentanol and 303 parts of 2-ethylhexanol in the presence of 3 parts of sulfuric acid. The mixture is heated to and maintained at 150° C. until there are collected in the receiver 30.5 parts of water. At that time, the pressure is reduced to 1 mm. mercury to strip off any residual water and excess alcohol mixture. The reaction mixture is cooled and there is collected in good yields the mixed ester di(2-ethylhexyl) di(2-methylpentyl) pyromellitate.

In the same manner, there are prepared tri(2-ethylhexyl)-2-methylpentyl pyromellitate. Also, following the same procedure, there are prepared di(2-ethylhexyl)di(n-octyl) pyromellitate and di(n-hexyl)di(2-methylpentyl) pyromellitate.

In accordance with my invention, the specified alkyl esters of pyromellitic acid are very valuable in plasticizing vinyl chloride polymeric compositions. These vinyl chloride compositions are considered as a class which include both polyvinyl chloride and copolymers of vinyl chloride in a major proportion, such as above 80%, with other compounds, especially vinyl compounds, in a minor proportion, such as not in excess of 20% by weight of the final resin. The vinyl chloride can be polymerized in bulk, in suspension, or as an emulsion of liquid vinyl chloride in water. While it is possible to polymerize the vinyl chloride in the presence of a primary plasticizer, this usually is not done in commercial processes. The invention is applicable to both the pre-plasticized vinyl polymers in this way and to the after-plasticized vinyl chloride polymers.

Typical vinyl compounds which may be used with vinyl chloride to form interpolymers to which this invention is applicable are vinyl acetate, vinylidene chloride, lower alkyl esters, acrylic esters and vinyl alkyl esthers. As exemplary of these copolymer materials, there may be mentioned vinyl chloride with vinyl acetate, vinyl chloride with vinyl butyrate, vinyl chloride with vinyl propionate, interpolymers of vinyl chloride with 5% to 20% of vinylidene chloride, interpolymers of vinyl chloride and methyl acrylate, such as 80% vinyl chloride with 20% methyl acrylate, terpolymers of vinyl chloride, vinylidene chloride with ethyl acrylate, copolymers of vinyl chloride and butyl acrylate, copolymers of vinyl chloride, acrylonitrile, and the like. While the above copolymers may contain upwards of 50% chloride by weight of the copolymers, those having at least 85% vinyl chloride are preferred.

Plasticizers ordinarily are incorporated in vinyl chloride polymers by mixing the powdered resin with the liquid plasticizer followed by mixing and/or kneading and then by curing the mix at an elevated temperature, for example, within the range from 150° to 200° C., on hot rolls or in a heated mixer, such as a Werner-Pfleiderer or Banbury mixer. The proportion of plasticizer employed will depend upon the initial properties of the resin and of the desired effect. Proportions of plasticizer are based on 100 parts of polyvinyl resin. On that basis, there may be employed 10 to 200 parts of plasticizer per 100 parts of resin. Generally, 20 to 90 parts of plasticizer are useful amounts; while 30 to 60 parts are a preferred proportion. In conjunction with plasticizers of our invention, there may be employed fillers, lubricants, pigments, and stabilizers as described hereinafter.

The alkyl pyromellitates of my invention may be used in conjunction with other common primary plasticizers, such as DOP, dioctyl adipate, tetraoctyl phosphate, polymeric plasticizers, epoxides, and the like. Moreover, the esters of this invention may be employed in conjunction with antioxidants, such as phosphites, amines and phenols, also with pigments, colors, fillers, and polymer stabilizers, such as organo tin compounds like dibutyltin dilaurate.

The following resinous compositions further illustrate valuable aspects of my invention.

In compositions A and B, there are employed the tetraalkyl esters of my invention. Composition A is a standard formulation. Composition B is an electrical grade formulation.

TABLE I

| Composition | A Standard | B Electrical |
|---|---|---|
| Ingredients: | | |
| Polyvinyl chloride | 60 | 65 |
| Ester tested | 40 | 35 |
| Coprecipitated Barium-Cadmium salt (stabilizer) | 1 | |
| Tribasic lead sulfate (stabilizer) | | 5 |
| Clay (filler) | | 15 |
| Wax (lubricant) | | 0.3 |

The plasticizing pyromellitates of my invention and the other ingredients are incorporated with powdered vinyl chloride polymer and compounded on differential speed rolls. The compositions are individually fluxed and milled on a roller mill at 325° F. until they are uniform. They are then sheeted off the mill at a thickness of 10 mils and slabs of an approximate thickness of 100 mils are molded for use in Test 5.

The physical and mechanical properties of the resinous compositions plasticized with pyromellitic alkyl esters of this invention are tested in accordance with the following standard tests:

*Test 1.*—Activated carbon volatility: 2" squares of weighed specimens are placed between 2-inch layers of activated carbon in sealed glass jars which are maintained at 90° C. for 24 hours, and 4 days. The specimens are removed, dusted free of carbon and reweighed.

*Test 2.*—Soapy water extraction: 3" squares of weighed specimens are immersed in a 1% aqueous solution of Ivory soap at 90° C. for 24 hours, after which they are thoroughly washed, dried and reweighed.

*Test 3.*—Hexane extraction: Weighed samples are immersed in white, lead-free hexane at 25° C. for two hours, after which they are thoroughly dried and reweighed.

*Test 4.*—Torsional modulus at low temperatures: A 2¼ x ¼ sample is cut and mounted in a Tinius-Olsen Stiffness Tester, which measures the torsional modulus of plastic at various temperatures. The temperature at which a specimen has a torsional modulus of 135,000 lbs./sq. in., known as $T_f$ or $T_{135,000}$, is determined. This roughly corresponds to the "brittle point" obtained by cantilever apparatus.

*Test 5.*—Electrical properties: Electrical properties of the compositions of this invention are tested by determinations of volume resistivity. Volume resistivity has been shown to have excellent correlation with insulation resistance. The tests are carried out on a specimen of the resinous compositions, molded into a standard 4 cavity A.S.T.M. mold to give specimens of 6" x 6" x approximately 0.075". Silver lacquer-painted electrodes were centered on and attached to both sides of the molded slab. A Keithley vacuum tube electrometer, model 200, a Keithley decade shunt and a direct current power supply were then used to determine the resistance of the sample. The procedure is further described in "Rubber Age," pages 105 to 108, April 1956, C. E. Balmer and R. F. Conyne, and in "Resin Review," pages 3 to 9, vol. 6, No. 1, Rohm & Haas Company.

The electrical properties in terms of insulation resistance are tested by subjecting the standard specimens to a significant number of volume resistivity tests. The samples are tested to temperatures of
(a) 90° C.
(b) 60° C. immediately after immersion for 20 hours in water heated at 60° C.

The following Table II shows mechanical, physical, and electrical properties of typical tetraalkyl esters of pyromellitic acid of this invention.

with conventional resinous compositions. Plasticized compositions of polyvinyl chloride containing varying amounts of the tetraalkyl pyromellitates of this invention show plasticizing effect depending on the amount of plasticizer employed. In amounts of 10 parts by weight of the resinous composition, a definite improvement may be noticed. In all cases, there may be observed an improvement over compositions plasticized with DOP, and an especially remarkable improvement in permanence and in electrical properties is noted. For electrical applications, a total proportion of plasticizer in the range of 30 to 50 parts, based on the amount of polyvinyl, may be recommended.

Formulations are prepared which contain instead of a single plasticizing ester of this invention a mixture of

| | Parts |
|---|---|
| TXP | 5 |
| TPP | 30 |
| TOP | 5 |

The resulting compositions have most satisfactory permanence, excellent low temperature flexibility, and excel with respect to their electrical properties. Resinous compositions plasticized with other mixtures of esters of this invention have comparable desirable properties.

TXP, TPP, and TOP are individually, evenly incorporated into copolymer compositions similar to Compositions A and B in all respects except that polyvinyl chloride is replaced by copolymers of C—vinyl chloride, 87 parts, and vinyl acetate 13 parts;
D—vinyl chloride, 80 parts, and vinylidene chloride, 20 parts;
E—vinyl chloride, 80 parts, and methyl acrylate, 20 parts;
F—vinyl chloride, 95 parts, and vinyl isobutyl ether, 5 parts.

In all resinous compositions, there are noted improved performance over DOP plasticized resinous compositions, particularly with respect to permanence properties and electrical resistivity.

When there are incorporated into 65 parts of polyvinyl chloride 35 parts of the mixed ester, di-2-ethylhexyl 2,2-dimethylpentyl pyromellitate, the resulting resinous composition has improved permanence and electrical properties over resinous compositions plasticized with DOP.

Similar improved compositions are obtained with tri-2-ethylhexyl 2,2-dimethylpentyl pyromellitate, tri-2,2-dimethylpentyl-n-hexyl pyromellitate, and di-2,2-dimethylpentyl di-2-methylpentyl pyromellitate.

Incorporation of 100 parts of tetra(2,2-dimethylpentyl) pyromellitate with 100 parts of polyvinyl chloride gives a highly plasticized composition having permanence properties and electrical properties superior to those imparted by DOP.

TABLE II.—PERFORMANCE DATA

| Plasticizer | Permanence Properties, Percent Loss in Weight | | | | Electrical Prop.—Volume Resistivity (ohm-cms.×10¹²) | | Ret. of Elec. Prop.—Immersion in Water at 75° C. for 24 Hours—Vol. Resist. (ohm-cms.×10¹²) | Low Temp. Flex. ($T_f$)° C. |
|---|---|---|---|---|---|---|---|---|
| | Activated Carbon Volatility | | Soap Extraction at 90° C. | Hexane Extr. | 90° C. Dry | 60° C. Wet | | |
| | 24 Hrs. at 90° C. | 4 Days at 90° C. | | | | | | |
| DOP | 8–9 | 15.3 | 8–11 | 32 | 1.1 | 2.1 | 2.6 | −31 to −34 |
| TXP | 0.5 | 0.8 | 0 | 27 | 2.4 | 7.3 | | −13 |
| TOP | 0.6 | 0.9 | 0 | 33 | 5.0 | 16.0 | 4.5 | −21 |
| TPP | 0.5 | 0.8 | 0 | 30 | 3.7 | 12.0 | | −18 |

Key: DOP—di(2-ethylhexyl)phthalate; TXP—tetra(2-methylpentyl) pyromellitate; TOP—tetra(2-ethylhexyl) pyromellitate; TPP—tetra(2,2-dimethylpentyl) pyromellitate.

With respect to other properties, such as Shore Hardness, compatibility and heat stability, the resinous compositions of our invention compare quite satisfactorily Composition A is plasticized with 45 parts of a pyromellitate ester of an eight carbon-containing mixture of alkanols derived from the Oxo process. Polyvinyl chloride content is adjusted to 55 parts. Performance data demonstrate that the resulting composition has permanence and electrical properties superior to those imparted by DOP. Similar results are obtained wherein the plasticizer is a tetrahexyl pyromellitate or a tetraheptyl pyromellitate, which are obtained from 6 and 8 carbon-containing mixtures of alkanols resulting from the Oxo process. Electrical properties are especially noteworthy. A group of esters of my invention which come within special consideration are tetra(2,2-dimethylpentyl) pyromellitate, tetra(2,2-dimethylhexyl) pyromellitate, and tri(2,2-dimethylpentyl) pyromellitate. The resulting resinous compositions show decisive advantages over conventional compositions.

The performance data of typical esters of this invention prove that they possess an uncommon and unexpected combination of good stability and permanence properties allied with excellent electrical properties.

The compositions of my invention are very useful in numerous industrial applications. They are particularly valuable for electrical wiring, printing rolls, cable coverings, floorings, pliable thin sheetings, and film finishes for textiles. For wire coating about 30% or less plasticizer is used and the material is extruded directly around the wire. They may also be used in the preparation of plastisols, plastigels, and organosols, i.e., vinyl chloride polymer plasticizer paste with or without volatile solvents.

I claim:

1. A resinous composition comprising a polymer selected from the group consisting of homopolymers of vinyl chloride and copolymers of vinyl chloride with an ethylenically unsaturated monomer copolymerizable therewith, said copolymer containing at least about 80% by weight of vinyl chloride combined therewith and said resinous composition having incorporated therein about 10 to about 200% by weight of a tetraalkylpyromellitate, in which the alkyl group contains from 6 to 8 carbon atoms.

2. The resinous composition of claim 1 in which the tetraalkyl pyromellitate has a branched alkyl group containing from 6 to 8 carbon atoms.

3. The resinous composition of claim 1 having incorporated therein about 20 to 90% by weight of a tetraalkyl pyromellitate in which the alkyl group contains 6 carbon atoms.

4. The resinous composition of claim 1 in which the tetraalkyl pyromellitate is tetra-2-methylpentyl pyromellitate.

5. The resinous composition of claim 1 in which the tetraalkyl pyromellitate is tetra-2,2-dimethylpentyl pyromellitate.

6. The resinous composition of claim 1 in which the tetraalkyl pyromellitate is tetra-2-ethylhexyl pyromellitate.

7. The resinous composition of claim 1 in which the polymer is a homopolymer of vinyl chloride.

8. The resinous composition of claim 1 in which the polymer is a copolymer of vinyl chloride and an ethylenically unsaturated monomer copolymerizable therewith.

9. The resinous composition of claim 1 in which the alkyl groups in the tetraalkyl pyromellitate are branched alkyl groups having 7 carbon atoms.

10. The resinous composition of claim 1 in which the alkyl groups in the tetraalkyl pyromellitate are branched alkyl groups having 6 carbon atoms.

References Cited by the Examiner

UNITED STATES PATENTS

| | | | |
|---|---|---|---|
| 1,984,283 | 12/1934 | Reid | 260—103 |
| 1,993,736 | 3/1935 | Graves et al. | 260—31.8 |
| 2,862,959 | 12/1958 | Patrick et al. | 260—31.8 |

OTHER REFERENCES

Simonds, Handbook of Plastics, Van Nostrand Co., New York, 1949, 2nd Ed. (pages 337–350).

MORRIS LIEBMAN, *Primary Examiner.*

LESLIE H. GASTON, DANIEL ARNOLD, *Examiners.*